Patented June 24, 1930

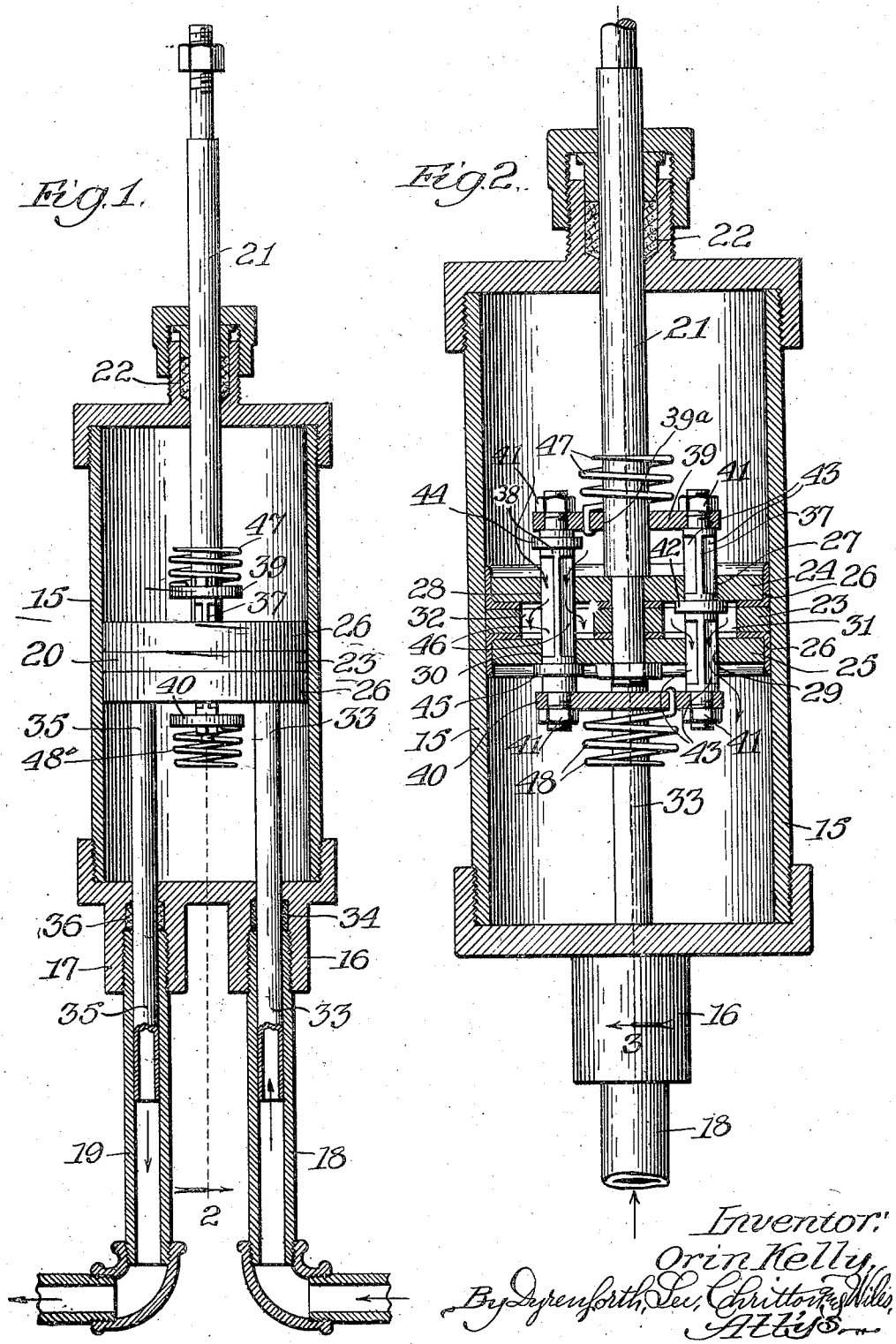

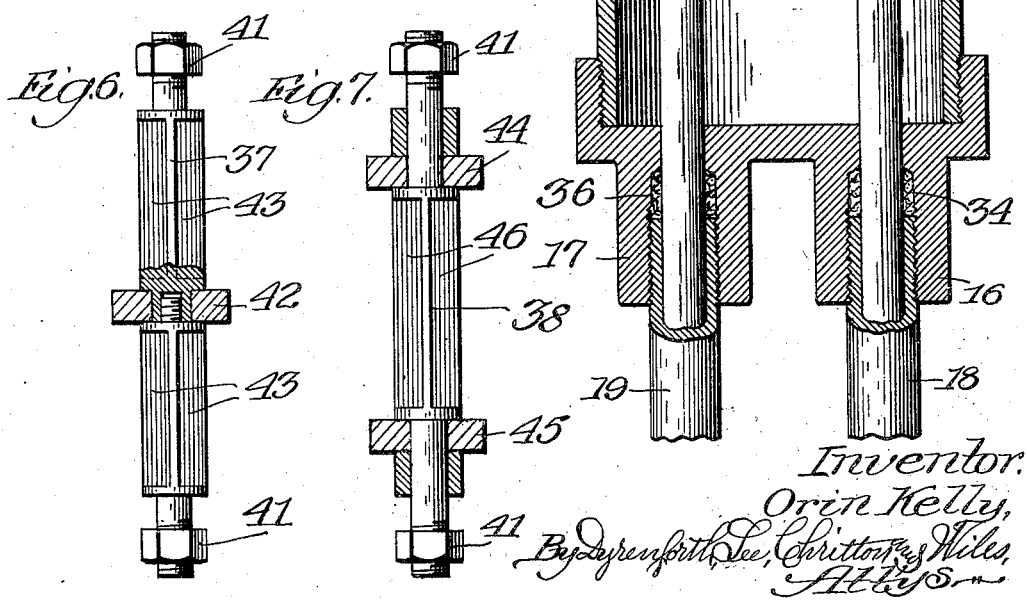

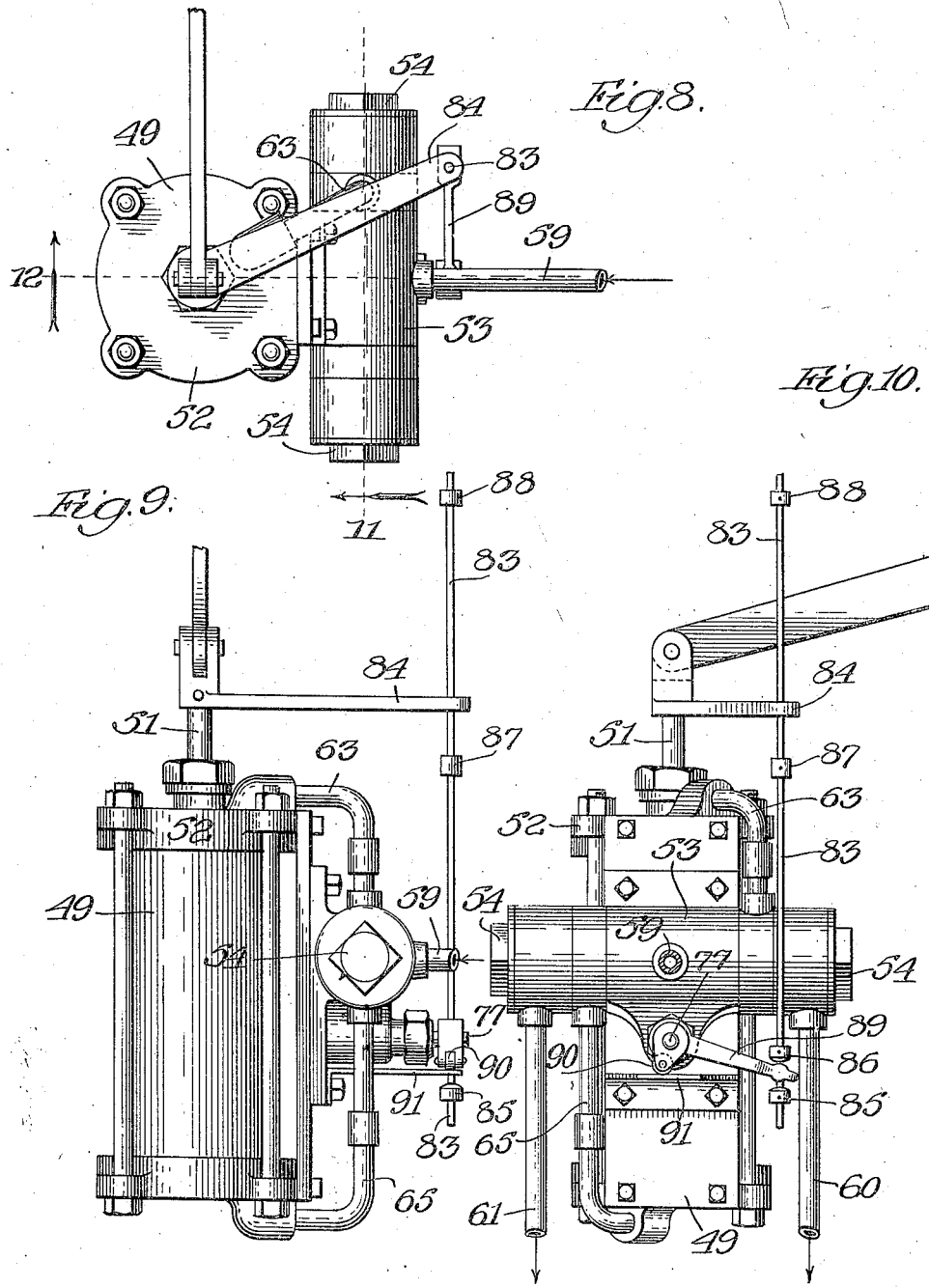

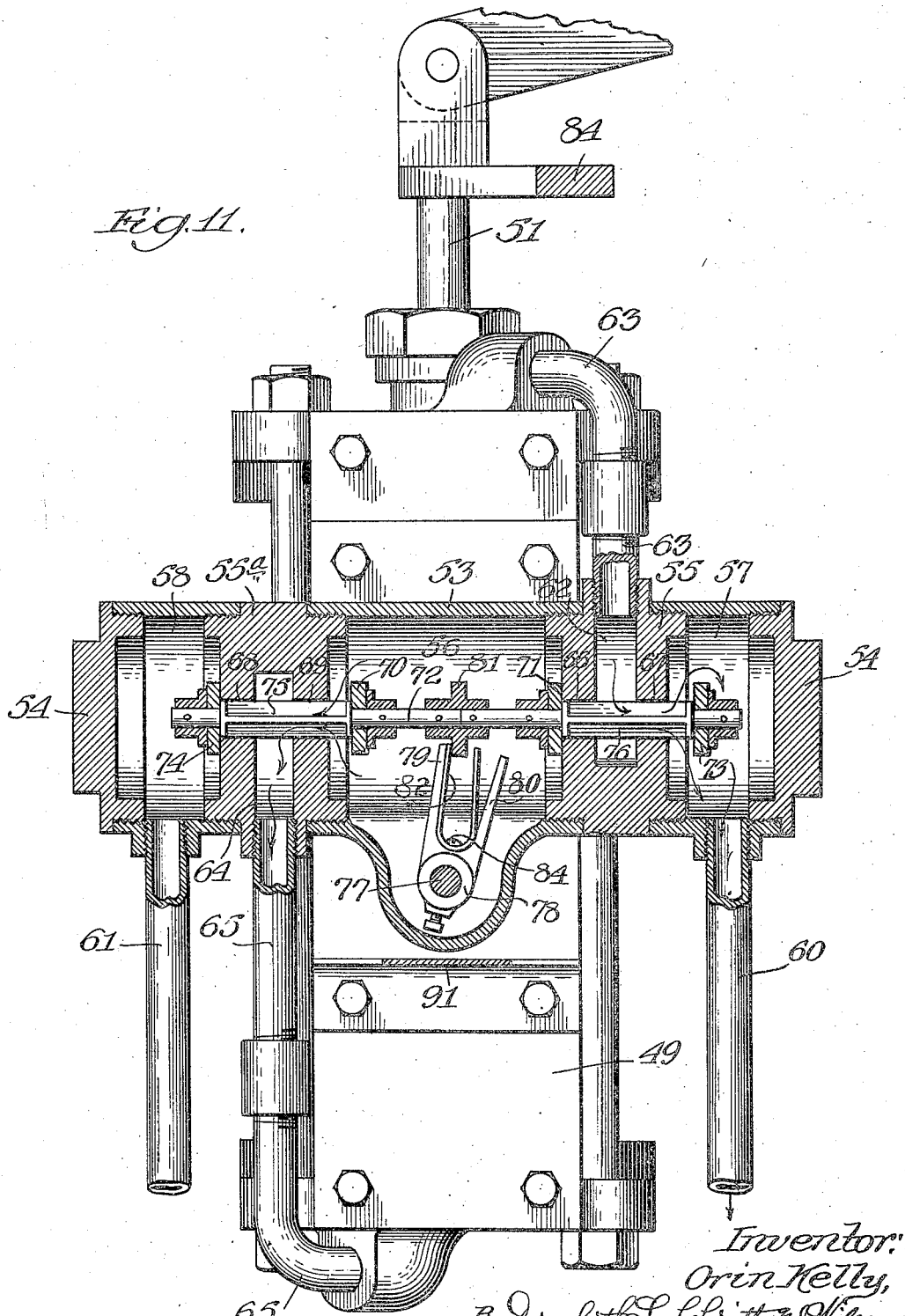

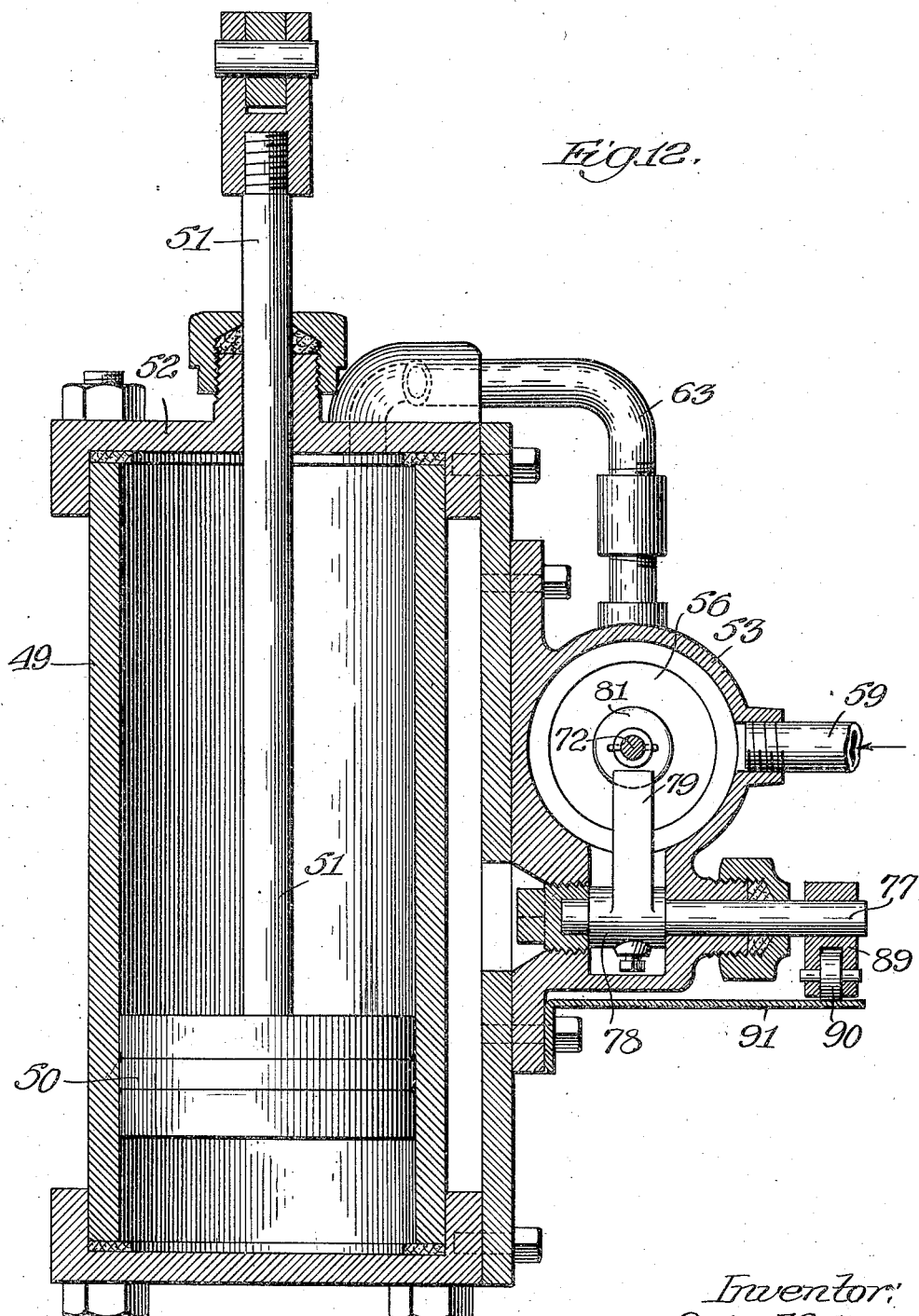

1,767,214

UNITED STATES PATENT OFFICE

ORIN KELLY, OF COLUMBUS, OHIO

FLUID-PRESSURE MOTOR

Application filed August 1, 1927. Serial No. 209,716.

My invention relates, more particularly, to motors employing liquid, such as water under pressure, as the fluid for operating them, and my primary object is to provide a construction of motor which shall be relatively simple and economical of construction and positive in operation, and which may be operated relatively slowly without danger of slippage or leakage of the actuating fluid; and other objects as will be manifest from the following description.

Referring to the accompanying drawings:—

Figure 1 is a view in longitudinal elevation of a fluid pressure motor constituting one embodiment of my invention, the piston member of which, together with certain other parts, is shown in side elevation. Figure 2 is a view like Fig. 1, but enlarged, of the piston and cylinder portion of the mechanism therein shown, this view being taken at the line 2 on Fig. 1 and viewed in the direction of the arrow. Figure 3 is a section taken at the lines 3 on Figs. 2 and 4 and viewed in the directions of the respective arrows. Figure 4 is a plan sectional view taken at the line 4 on Fig. 3 and viewed in the direction of the arrow. Figure 5 is a plan sectional view taken at the line 5 on Fig. 3 and viewed in the direction of the arrow. Figure 6 is a detailed view, with a portion thereof broken away of the valve by which the flow of the actuating fluid to opposite ends of the cylinder is controlled. Figure 7 is a similar view of the valve by which the exhaust of the spent fluid from the opposite ends of the cylinder is controlled. Figure 8 is a plan view of another embodiment of my invention. Figure 9 is a view in side elevation of the mechanism of Fig. 8. Figure 10 is a similar view of the mechanism, the latter being viewed from the right-hand side in Fig. 9. Figure 11 is an enlarged sectional view taken at the line 11 on Fig. 8 and viewed in the direction of the arrows; and Figure 12, an enlarged sectional view taken at the line 12 on Fig. 8 and viewed in the direction of the arrows.

Referring to the construction shown in Figs. 1 to 7, inclusive, the mechanism comprises a cylinder 15 the lower end of which is provided with tubular bosses 16 and 17 which open into the interior of the cylinder, these bosses having screwed into them pipes 18 and 19, respectively, the pipe 18 leading to any suitable source of operating fluid under pressure, as for example, and more particularly, water, and the pipe 19, through which the spent liquid from the cylinder is exhausted, leading to any suitable point of discharge.

Slidable in the cylinder 15 is a piston 20 provided with a stem 21 slidable in an opening 22 in the upper end of the cylinder 15, this stem being adapted at its outer end for connection with the device to be operated by the piston.

The mechanism shown is adapted to automatically reciprocate the piston 20 in opposite directions and to this end is provided with valve mechanism which operates automatically, in response to the movements of the piston, to introduce the actuating fluid into opposite ends, alternately, of the cylinder 15 and exhaust the spent liquid therefrom. In this construction the valve mechanism is contained within, and carried by, the piston 20 which is shown as formed of three disks 23, 24 and 25, with piston leathers 26 confined therebetween. The disk 24 contains openings 27 and 28 and the disk 25 openings 29 and 30, the openings 27 and 28 aligning with the openings 29 and 30, respectively. The disk 23 contains relatively large openings 31 and 32 which align, respectively, with the aligned openings in the disks 24 and 25 and form therewith ports each opening through both faces of the piston and thus in communication with both ends of the cylinder. The opening 31 is in communication with one end of a pipe 33 rigidly secured to the piston and extending slidably through packing 34 in the boss 16, and slidably telescoping at its lower end with the pipe 18. The opening 32 communicates with the upper end of a pipe 35 rigidly secured to the piston and slidable in packing 36 in the boss 17 and in the pipe 19 with which it telescopes, it being understood from the foregoing that as the piston 20 reciprocates in the cylinder 15 the pipes 33 and 35 slide up and down in the pipes 18 and 19.

The valves proper for controlling communication between the ports in the piston and the opposite ends of the cylinder are represented generally at 37 and 38 these valves being mounted to reciprocate in the ports which they control. The valves 37 and 38 are rigidly connected together to operate as a unit, by plates 39 and 40, secured to these valves by nuts 41 screwing on the threaded extremities of these valves, the plate 39 being apertured at 39$^a$ to receive the piston stem 21 on which the plate 39 slides.

The valve 37 is provided at the portion thereof which extends into the opening 31, with a flange 42 constituting a head of a larger diameter than the openings 27 and 29 and at opposite sides of this head is fluted as represented at 43.

The valve 38 is provided at opposite ends beyond the outer faces of the disks 24 and 25 with flanges 44 and 45 forming heads of larger diameter than the openings 28 and 30, and intermediate these heads is fluted as represented at 46.

The plates 39 and 40 are provided with coil springs 47 and 48, respectively, which, respectively, extend upwardly and downwardly beyond the unitary structure formed of the valves and plates 39 and 40 as shown these springs being located centrally of the cylinder, the upper spring 47 surrounding the piston stem 21 in spaced relation thereto.

The operation of the mechanism described is as follows:

Assuming that the parts of the mechanism are in the position shown in Figs. 1 to 7, inclusive, in which position the actuating fluid flows through the pipes 18 and 33 into the opening 31 in the piston and thence along the fluted portions 43 and into the lower end of the cylinder 15 and the spent fluid in the upper end of the cylinder discharges through the fluted portions 46 and into the opening 32 and thence through the pipes 35 and 19, the piston in continuing its upward movement carries the spring 47 into engagement with the upper head of the cylinder 15 with the result that this spring becomes compressed and exerts downward pressure on the valve mechanism which continues to increase until it overcomes the pressure of the incoming fluid against the valve heads 42 and 45 and which operates to hold these valves against their seats, whereupon the valve mechanism is quickly shifted downwardly to close the passage 29 to the passage 31 and open to the latter the passage 27 and close the passage 28 to the passage 32 and open to the latter the passage 30. The actuating fluid thereupon flows into the upper end of the cylinder and the spent fluid beneath the piston discharges through the pipes 35 and 19. The piston is thus forced downwardly and continues this movement until sufficient energy is stored in the lower spring 48, in contacting with the lower head of the cylinder, to overcome the pressure of the fluid in holding the valves in the position last stated, whereupon the valve mechanism is again shifted upwardly to the position shown in Fig. 2 and the piston is again driven upwardly, this cycle of operations continuing so long as fluid under pressure continues to be supplied to the pipe 18.

By way of further explanation, it may be stated that the arrangement of the passages and valves as described is such that when the valves are shifted to either of the two positions referred to, the force exerted by the actuating fluid serves to forcibly press the valve heads against the seats cooperating therewith to effectually prevent leakage, the springs 47 and 48 serving, in the final movements of the piston to store up pressure until the pressure of the actuating fluid against the valves is overcome, whereupon the valve structure is positively moved into its position of reverse.

Referring now to the mechanism illustrated in Figs. 8 to 12, inclusive, and which involves the provision, exterior of the cylinder, of the valve mechanism for controlling the reciprocations of the pistons, this mechanism comprises a cylinder 49 containing a piston 50 reciprocable therein and provided with a piston rod 51 operating through the end 52 of the cylinder, the outer end of this rod being adapted for connection with the device to be operated by the piston. The valve mechanism in this construction comprises a casing 53 having heads 54 at its ends and intermediate these heads and spaced therefrom and from each other, partitions 55 and 55$^a$, thereby providing chambers 56, 57 and 58 in the casing. The chamber 56 communicates with a pipe 59 which leads from any suitable source of actuating fluid, as for example, and preferably, water under pressure; and the chambers 57 and 58 communicate, respectively, with pipes 60 and 61 forming exhaust passages and leading to any suitable point of discharge.

The partition 55 contains a chamber 62 which opens into a pipe 63 in communication with the upper end of the cylinder 49; and the partition 55$^a$ contains a chamber 64 which opens into a pipe 65 in communication with the interior of the cylinder 49 at the lower end of the latter. The partition 55 contains aligning openings 66 and 67 substantially coincident with the longitudinal axis of the casing 53 which open at their inner ends into the chamber 62 and at their outer ends into the chambers 56 and 57, respectively. The partition 55$^a$ contains aligning openings 68 and 69 disposed substantially coincident with the longitudinal axis of the casing 53 and opening at their inner ends into the chamber 64 and at their outer ends into the chambers 56 and 58, respectively.

In the casing 53 is the valve mechanism proper, this mechanism comprising valve heads 70 and 71 mounted on a reciprocal valve rod 72 and located in the chamber 56, these heads being larger than the passages 66 and 69; and valve heads 73 and 74 mounted on the outer ends of the valve rods 72 and located in the chambers 57 and 58, respectively, these heads being larger than the passages 67 and 68. The valve rod 72 between the heads 70 and 74, and 71 and 73, at which it extends through the openings 68 and 69, and 66 and 67, is fluted as represented at 75 and 76, respectively. The valve heads are so disposed that the heads 71 and 74 will seat simultaneously and the heads 70 and 73 will likewise seat simultaneously in the movement of the rod 72 into the different positions to which it is adapted to be reciprocated.

When the valve mechanism occupies the position shown in Figs. 8 to 12, inclusive, the actuating fluid flows from the pipe 59 into the chamber 56, thence through the passage 69 into the passage 64 and pipe 65 to the lower end of the cylinder which thereby forces the piston 50 upwardly, the spent fluid above the piston discharging through the pipe 63, the passages 62, 67 and 57, to the exhaust pipe 60. When the valve mechanism is shifted to the left in Fig. 11 from the position therein shown the valve heads 70 and 73 become seated and the valve heads 71 and 74 unseat, whereupon the incoming actuating fluid passes from the chamber 53 through opening 66, passage 62, and pipe 63, to the upper end of the cylinder thereby forcing the piston downwardly, the fluid below the piston discharging through the pipe 65, chamber 64, passage 68, and chamber 58, to the exhaust pipe 61.

It will be understood from the foregoing that the pressure exerted by the incoming fluid in the chamber 56 against the one of the valves 70 and 71 which is in closed position is sufficient to hold the valve device in a position in which the exhausting end of the cylinder is tightly closed against escape of the actuating fluid thereto, thereby preventing undesirable leakage or slippage of the actuating fluid.

The mechanism shown for automatically reciprocating the valve rod 72 and the valve-heads carried thereby, responsive to the reciprocations of the piston 50, comprises a rock shaft 77 journalled to extend into the casing 53 where it is provided with a fork 78 the arms of which are represented at 79 and 80, these arms straddling a projection 81, in the form of a flange extending laterally from the valve rod 72. The fork 78 is provided internally with a leaf spring 82 of general U-shape which is rigidly secured to the fork as indicated at 84 and extends at its free ends between the arms 79 and 80 of the fork, the spring being of such shape that the ends thereof, when the spring is in normal condition, are spaced from these arms as shown of one of the arms in Fig. 11. The spring 82 is thus a part of the fork 78 and its ends operate automatically to engage alternately with opposite faces of the flange 81 in the oscillations of the shaft 77 for reciprocating the valve rods 72 and the parts carried thereby.

It may be here stated that the resistance afforded by the ends of this spring is such that in the oscillations of the shaft 77 the spring stores up power until the pressure of the fluid tending to hold the valve mechanism in set position is overcome, whereupon the spring forcibly moves the valve mechanism to reverse position.

Any suitable means for oscillating the shaft 77 in timed relation to the movements of the piston 50 may be provided, those shown comprising a slide rod 83 mounted in a guide 84 extending laterally from the piston rod 51 and provided with two sets of tappets comprising the tappets 85, 86, 87 and 88. The tapets 85 and 86 cooperate with an arm 89 extending laterally from the shaft 77 and projecting at its outer end into the space between these two tappets, this arm containing a slot (not shown) through which the rod 83 extends and in which it is slidable. The arm 89 is preferably provided with a roller 90 engaging a leaf spring 91 projecting laterally from the cylinder 49 and operating to prevent accidental shifting of the rod 83 from the position to which it is operated. The tappets 87 and 88 cooperate with the arm 84 on the piston and are adapted to be alternately engaged thereby as the piston nears the limit of its movement in opposite directions, respectively.

Thus assuming the parts of the mechanism to be in the position shown, as the piston 50 nears the limit of its upward movement the arm 84 engages the tappet 88 thereby lifting the rod 83 and oscillating the shaft 77 in counterclockwise direction in Fig. 11 with the result of moving the valve mechanism into reverse position to direct the actuating fluid into the top of the cylinder and exhaust the spent fluid from the bottom thereof. As the piston nears the limit of its downward movement the arm 84 engages the tappet 87 and returns the rod 83 and the shaft 77 to the position shown in Figs. 10 and 11 to direct the incoming fluid into the lower end of the cylinder and discharge the spent fluid from the top thereof.

The various valve heads of both of the constructions as above described, may be